United States Patent [19]

Wong et al.

[11] Patent Number: 4,882,059

[45] Date of Patent: Nov. 21, 1989

[54] SOLUBILIZATION OF ORGANIC MATERIALS IN WASTEWATER TREATMENT

[75] Inventors: John M. Wong; Thomas J. Lowe, both of Lakewood, Ohio

[73] Assignee: General Environmental Science, Beachwood, Ohio

[21] Appl. No.: 125,388

[22] Filed: Nov. 25, 1987

[51] Int. Cl.$^4$ ................................................. C02F 3/34
[52] U.S. Cl. ..................... 210/606; 210/610; 210/632
[58] Field of Search ............... 210/606, 610, 611, 620, 210/632

[56] References Cited

U.S. PATENT DOCUMENTS

| | | | |
|---|---|---|---|
| 3,801,499 | 4/1974 | Luck | 210/606 |
| 3,961,078 | 6/1976 | Stitt | 210/610 X |
| 4,018,650 | 4/1977 | Busta et al. | 210/611 X |
| 4,081,367 | 3/1978 | Hulls et al. | 210/610 |
| 4,332,904 | 6/1982 | Kurane et al. | 210/611 X |

Primary Examiner—Tom Wyse
Attorney, Agent, or Firm—Birch, Stewart, Kolasch & Birch

[57] ABSTRACT

A method for solubilizing particulate or colloidal materials in wastewater treatment comprising the steps of cultivating aerobic bacteria in the presence of oxygen in an activator solution containing a food source until the level of the food source drops below 50 mg/l of soluble chemical oxygen demand (sCOD) and said bacteria begin producing increased amounts of enzymes which solubilize particulate or colloidal materials thereby producing activated bacteria and thereafter contacting said activated bacteria or enzymes with said particulate or colloidal materials under conditions which solubilize said particulate or colloidal materials. The method is particularly useful for solubilizing particulate and/or colloidal materials containing insoluble starch, grease, fat and protein with enzymes such as amylase, lipase and/or protease.

10 Claims, 2 Drawing Sheets

SOLUBILIZATION OF ORGANIC MATERIALS IN WASTEWATER TREATMENT

FIELD OF THE INVENTION

The present invention relates to the solubilization of particulate and/or colloidal materials, particularly in wastewater treatment.

BACKGROUND OF THE INVENTION

The majority of municipal and industrial wastewater treatment is accomplished through use of biological wastewater treatment. Aerobic biological wastewater treatment is a process in which an aerobic slurry of microorganisms removes organic matter from wastewater. The microorganisms are then separated from the treated wastewater, typically by sedimentation. Municipal and most industrial wastewaters contain both soluble and insoluble organic matter. Removal of the soluble component is accomplished primarily by bacteria. Bacteria range in size from about 0.5 to 10 microns in diameter, and are surrounded by a cell wall which provides structural integrity. The cell wall functions as a semipermeable barrier allowing the passage of soluble compounds while preventing the passage of molecules of approximate molecular weight 5,000 grams/gram-mole and larger. Therefore, bacteria are incapable of directly consuming colloidal and insoluble organics. Thus, a problem in biological wastewater treatment is removing colloidal and insoluble materials from the wastewater. One way of removing these materials is a physical treatment wherein a flocculating agent is added to the wastewater causing the insoluble and colloidal materials to form a flock which settles out of the wastewater. Another method is to solubilize the materials by the addition of enzymes and/or bacteria which produce enzymes which solubilize the materials. However, it is very difficult to dissolve all of the insoluble organic materials and therefore there is a need for an improved process for solubilizing insoluble organic materials in wastewater treatment.

SUMMARY OF THE INVENTION

The present invention relates to a method for solubilizing particulate or colloidal materials in wastewater treatment, comprising the steps of cultivating aerobic bacteria in the presence of oxygen in an activator solution containing a food source until the level of the food source in the solution drops low enough to cause said bacteria to begin producing increased amounts of enzymes which solubilize particulate or colloidal materials thereby producing activated bacteria, and contacting said activated bacteria or enzymes with said particulate or colloidal materials under conditions which solubilize said particulate or colloidal materials. When the soluble nutrients are used up, the bacteria will begin producing increased amounts of extracellular enzymes which solubilize insoluble organic substances such as starch, fat, grease and/or protein thereby converting these insoluble organic substances into their soluble components which can be used as a food source by the bacteria. If the insoluble organic substances are not present in the activator solution, the bacteria will continue to starve and the extracellular enzymes will accumulate in the activator solution. The method is particularly useful for treating wastewater containing particulate and/or colloidal materials and for cleaning pipes having grease deposits on the inside thereof.

In a more preferred aspect, the present invention is directed to a continuous method for solubilizing particulate or colloidal materials in wastewater treatment, comprising the steps of (a) cultivating aerobic bacteria in a first activation tank in the presence of oxygen in an activator solution containing a food source for a given amount of time until the level of the food source drops low enough to cause said bacteria to begin producing increased amounts of enzymes which solubilize particulate or colloidal materials thereby producing activated bacteria; (b) thereafter cultivating aerobic bacteria in a second activation tank under the same conditions and for the same given amount of time as the bacteria in said first activation tank while continuously introducing said activated bacteria and/or said enzymes in said first activation tank to a waste treatment zone thereby continuously contacting said activated bacteria and/or said enzymes with said particulate or colloidal materials in said waste treatment zone under conditions which solubilize said particulate or colloidal materials; (c) thereafter continuously introducing said activated bacteria and/or said enzymes in said second activation tank to said waste treatment zone thereby continuously contacting said activated bacteria and/or said enzymes with said particulate or colloidal materials in said waste treatment zone under conditions which solubilize said particulate materials while simultaneously activating additional aerobic bacteria in said first activation tank; and (d) repeating said steps (b) and (c) as necessary to thereby continuously deliver activated bacteria and/or enzymes to said waste treatment zone. This continuous process may employ more than two activation tanks if desired in order to continuously deliver activated bacteria and/or enzymes to said reaction zone.

The particulate and colloidal material which can be solubilized include organic materials such as greases, fats, starches and proteins. This invention is especially concerned with solubilization of particulate and colloidal materials which cannot pass through the cell wall of aerobic bacteria, particularly, those which have an approximate molecular weight of at least 5,000 grams/gram-mole, more particularly, those which have an approximate molecular weight of at least 10,000 grams/gram-mole.

Aerobic bacteria which are useful include any aerobic bacteria which produce extracellular enzymes which solubilize said particulate or colloidal materials and which produce increased amounts of said extracellular enzymes when they are starved, i.e., when they are cultivated in a nutrient solution after the soluble food source has been used up. Enzymes which are useful include lipase which solubilizes fat and grease, amylase which solubilizes starch and protease which solubilizes protein. Suitable aerobic bacteria include Pseudomonas which produce lipase and Bacillus which produce amylase and/or protease. The bacteria can be used alone or in a mixed culture.

The bacteria are activated by culturing them in an aerobic environment and in the presence of an activator solution thereby including bacterial multiplication. The bacteria are cultured in this activator solution until the primary soluble food source such as sugar in the nutrient medium is used up. The amount of soluble food source, nutrients, cultivation media and bacteria are desirably selected so that the food source is used up in about 8–40 hours, preferably 16–32 hours, most preferably about 24 hours. The soluble chemical oxygen demand (sCOD) of the activator solution is usually at least about 50 milligrams per liter (mg/l), generally 50 to 1000 mg/l, preferably 100 to 300 mg/l, most preferably about 150 mg/l.

When the sCOD of the soluble food source drops below about 50 mg/l, the bacteria will become activated and will begin producing increased amounts of extracellular enzymes. The bacteria are then cultivated under these starvation conditions until a desired level of increased extracellular enzyme production is achieved. Cultivation is continued under starvation conditions for about 12 to 96 hours, preferably about 16 to 72 hours, more preferably about 24 to 48 hours. The activator solution containing the enzymes, also preferably containing the activated bacteria therein, is then contacted with the particulate or colloidal material to be solubilized in a conventional manner.

The activator solution preferably contains a primary soluble food source such as sugars, organic acids, yeast extract and amino acids and essential micronutrients such as basic mineral salts. Basic mineral salts which will often be present include $NH_4Cl$, $KH_2PO_4$ and $MgSO_4$. Autolysed yeast cells are especially useful for providing the food source.

DETAILED DESCRIPTION OF THE INVENTION

Figure 1:
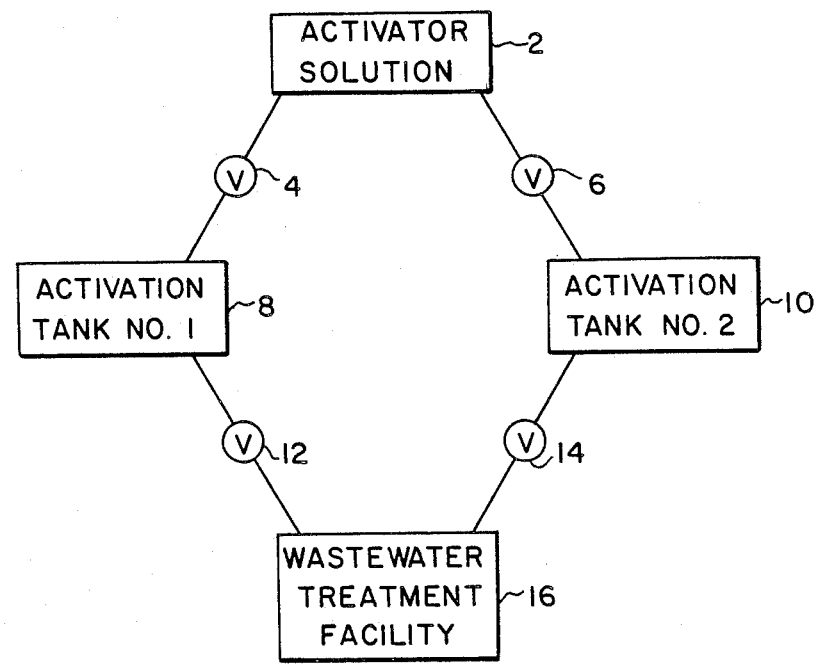
FIG. 1 is a flow diagram which represents a preferred system for carrying out the process of the present invention which utilizes two activation tanks.

As shown in FIG. 1, activator solution stored in storage tank 2 can be alternately delivered by valves 4 and 6 to a pair of aerated activation tanks 8 and 10. Activated bacteria from the tanks 8 and 10 can be supplied through valves 12 and 14 to the area where solubilization will take place such as wastewater treatment facility 16.

In a preferred embodiment, activator solution and bacteria are introduced into tank 8 to form an initial sCOD of about 120 mg/l. Cultivation is conducted for about 24 hours in tank 8 while aerating the solution until the soluble COD reaches 50 mg/l. At this point tank 10 is filled with activator solution and bacteria in the same way that tank 8 was filled at time zero. For the next 24 hours, cultivation is continued in tank 10 without discharge and tank 8 is continuously discharged to the wastewater treatment facility 16. At this point in time (t=48 hours) tank 8 is refilled and discharge from tank 10 to the wastewater treatment facility 16 begins. In this way, activated bacteria can be delivered to the wastewater treatment facility 16 on a continuous cycle by alternately delivering bacteria to the facility from tanks 8 and 10 on a 24 hour cycle.

EXAMPLE

The following experiments were performed to demonstrate the enhanced ability of the activation process to degrade macromolecules.

I. SOLUTION AND CULTURE PREPARATION

A. Pure Strain Bacillus That Produces Amylase and Protease

*Bacillus amyloliquefaciens* was obtained from American Type Culture Collection (ATCC). The ATCC strain number was 23842. The bacteria were aerobically grown in liquid suspension (see Bacteria Growth Medium, part C below) and preserved for future use according to the methods of U.S. Pat. No. 3,963,576 which is hereby incorporated by reference.

B. Pure Strain *Aerobacter aerogenes*

*Aerobacter aerogenes* that does not produce extracellular enzyme (ATCC 13906) was transferred to Bacterial Growth Medium, aerobically grown, and preserved according to the methods of U.S. Pat. No. 3,963,576.

C. Bacterial Growth Medium

All ATCC cultures described herein were grown from the freeze dried samples supplied by ATCC in aqueous bacterial suspensions using the following growth medium:

Bacterial Growth Medium Formulation

| Chemical | Concentration (mg/l) |
|---|---|
| $NH_4Cl$ | 200 |
| $KH_2PO_4$ | 200 |
| $MgSO_4$ | 50 |
| $CH_3COONa$ | 750 |
| Yeast Extract | 750 |

The above were dissolved in 90% deionized water and 10% tap water (to provide micronutrients), and autoclaved at 15 pounds steam for 30 minutes.

D. Activator Compound

A stock supply of Activator compound was prepared as follows:

| Chemical | Grams/Liter |
|---|---|
| Yeast Extract | 15 |
| $NH_4Cl$ | 4 |
| $KH_2PO_4$ | 4 |
| $MgSO_4$ | 4 |
| Distilled Water | 1 liter |

E. Macromolecule Medium

A solution containing an organic macromolecule as the primary carbon source was prepared as follows:

| Chemical | Concentrations (mg/l) |
|---|---|
| Casein | 150 |
| Soluble Starch | 150 |
| $MgSO_4$ | 10 |
| $NH_4Cl$ | 50 |
| $KH_2PO_4$ | 10 |
| Yeast Extract | 10 |
| $CH_3COONa$ | 10 |

The above were dissolved in 90% deionized water and 10% tap water (to provide micronutrients), and autoclaved at 15 pound steam for 30 minutes.

F. Standardization of Bacterial Suspensions

The aqueous bacterial suspensions (of parts A and B above) were plated on standard plate count media to determine the viable bacterial population. Autoclaved deionized water was then added to each suspension to adjust the viable cell concentration to $1 \times 10^8$ cells/cc.

II. INITIAL MACROMOLECULE DEGRADATION ASSAYS

A. Introduction

The Bacillus and Aerobacter suspensions were aerobically reacted with the macromolecule medium. Both the casein and soluble starch contained in the medium are of molecular weight greater than 10,000 gram/-gram-mole. In order for bacteria to grow on casein or soluble starch, the high molecular weight compounds must be solubilized to low molecular weight compounds so that the compounds can pass through the bacterial cell wall.

Assuming that solubilization occurs, bacteria will take up the amino acids, peptide, and sugars that are liberated by solubilization. A 0.45 micron filter is then used to separate bacteria from the growth medium, while all remaining components of the initial growth medium pass through the 0.45 micron filter. Defining soluble COD (sCOD) as the COD of the filtrate, the sCOD of the reaction mixture should change during the course of aerobic growth. If the bacteria produce amylase and protease, causing solubilization of the macromolecules, the bacteria will take up low molecular weight compounds which result from enzymatic hydrolysis and the sCOD will decrease over time. If the bacteria do not produce the appropriate extracellular enzymes, the sCOD will not change.

B. Procedures

The following reaction mixtures were prepared as follows:

|  | Reaction Vessel A | Reaction Vessel B |
|---|---|---|
| Macromolecule Medium | 990 ml | 990 ml |
| Bacillus Suspension | 10 ml | — |
| Aerobacter Suspension | — | 10 ml |
| Initial Bacterial Count | $1 \times 10^6$ cells/cc | $1 \times 10^6$ cells/cc |

Each reaction vessel was aerated, and sCOD, optical density (O.D.), and cell count were measured over time.

C. Results

| Hour of Reaction | Reaction Vessel A | | | Reaction Vessel B | | |
|---|---|---|---|---|---|---|
|  | O.D. | sCOD | Cell Count | O.D. | sCOD | Cell Count |
| 0 | 0.04 | 425 | $1 \times 10^6$/cc | 0.03 | 425 | $1 \times 10^6$/cc |
| 4 | 0.04 | 410 | — | 0.05 | 420 | — |
| 8 | 0.04 | 400 | — | 0.05 | 420 | — |
| 12 | 0.08 | 360 | — | 0.05 | 420 | — |
| 16 | 0.10 | 320 | — | 0.04 | 420 | — |
| 20 | 0.12 | 280 | — | 0.04 | 410 | — |
| 24 | 0.15 | 250 | — | 0.04 | 410 | — |
| 30 | 0.22 | 150 | — | 0.03 | 400 | — |
| 36 | 0.32 | 40 | $3 \times 10^8$/cc | 0.02 | 400 | $0.2 \times 10^6$/cc |

These data show that the Bacillus which produces protease and amylase degraded the macromolecule medium, while the Aerobacter without extracellular enzyme production did not.

III. PREPARATION OF ACTIVATED BACTERIAL SUSPENSION

Bacterial suspensions were prepared as follows:

| Tap Water | 931 ml |
|---|---|
| Activator Compound | 9 ml |
| Aerobacter Suspension | — |
| Bacillus Suspension | 60 ml |

The suspension was aerated. Changes during the course of reaction were as follows:

| Hours of Aeration | sCOD (mg/l) | Viable Cell Count |
|---|---|---|
| 0 | 150 | $6 \times 10^6$ |
| 4 | 120 | — |
| 8 | 50 | — |
| 12 | 30 | — |
| 18 | 35 | — |
| 24 | 25 | — |
| 30 | 40 | — |
| 36 | 35 | $2 \times 10^7$ |

Activation is defined as the process of aerating exoenzyme-producing bacteria in a nutrient broth until the bacteria begin high rate exoenzyme production. Activated bacterial suspension is defined as a suspension that has been aerobically grown until the sCOD has decreased to 50 mg/l or less. Samples from this suspension were taken at 2, 8, and 24 hours of activation, and were used in the macromolecule degradation tests below.

IV. USE OF ACTIVATED BACTERIAL SUSPENSION TO ACCELERATE MACROMOLECULE DEGRADATION

The following reaction vessels were prepared to test the ability of low doses of activated bacterial suspension to accelerate macromolecule degradation:

|  | A | B | C | D |
|---|---|---|---|---|
| Aerobacter Suspension | 10 ml | 10 ml | 10 ml | 10 ml |
| Bacillus Suspension | — | — | — | — |
| Activated Bacillus Sampled at: |  |  |  |  |
| a. 2 hrs of aeration | — | 0.01 ml | — | — |
| b. 8 hrs of aeration | — | — | 0.01 ml | — |
| c. 24 hrs of aeration | — | — | — | 0.01 ml |
| Volume of Macromolecule Medium (ml) | 990 | 990 | 990 | 990 |

Changes in sCOD for the above vessels during the course of aerobic reaction are given below:

| Hour of Aerobic Reaction | Remaining sCOD in Reaction Vessel | | | |
|---|---|---|---|---|
|  | A | B | C | D |
| 0 | 425 | 425 | 425 | 425 |
| 9 | 420 | 425 | 345 | 320 |
| 18 | 420 | 400 | 180 | 165 |
| 21 | 405 | 390 | 150 | 145 |
| 24 | 405 | 380 | 110 | 120 |

Figure 2:
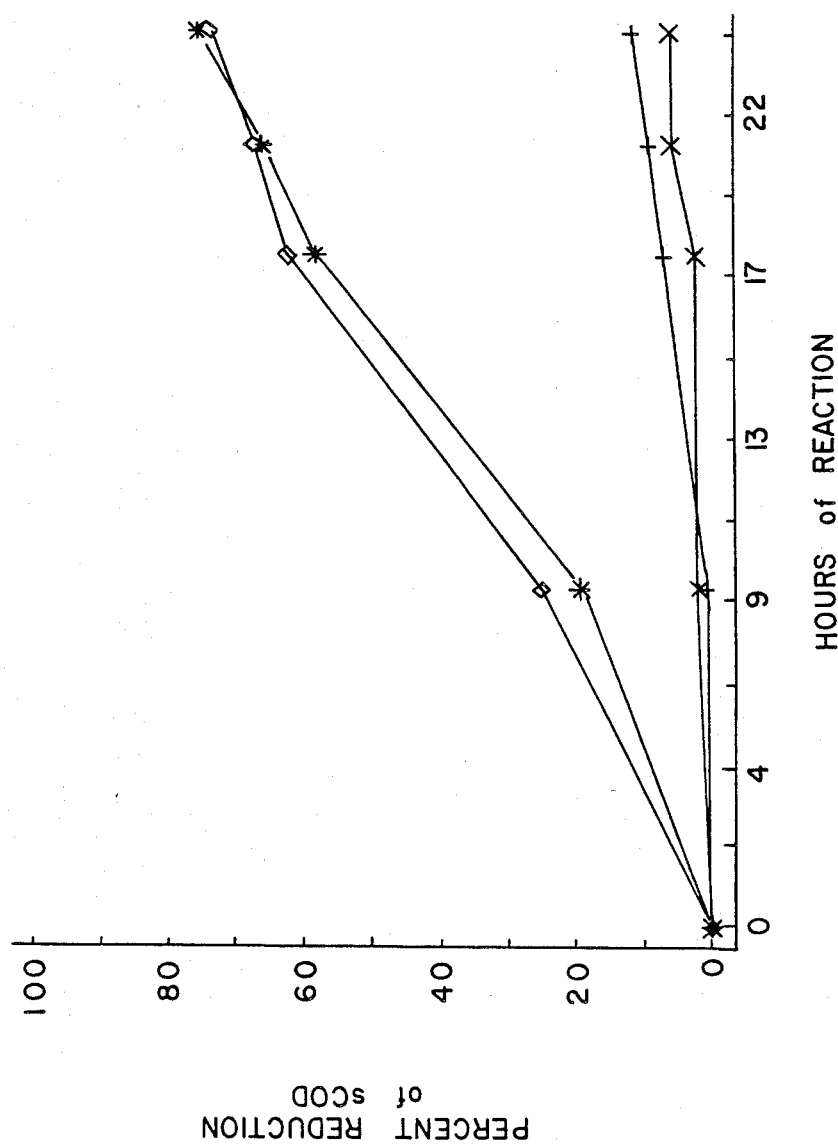
FIG. 2 is a graph showing the percent sCOD reduction versus time for the experiments reported in the Example.

FIG. 2 is a summary of the results, showing percent sCOD reduction versus time for the four reaction vessels.

The graph shows that:
1. Aerobacter addition alone did not reduce sCOD.

2. Addition of 10 ppm of Bacillus activated for two hours (before sCOD in the activation tank was depleted) improved sCOD reduction about 5% in 24 hours.
3. Both 8 hour and 24 hour activated Bacillus, each of which had sCOD less than 50 mg/l when taken from the activation tank, improved sCOD reduction by about 70%.

It is important to note that 10,000 ppm of unactivated Bacillus caused an sCOD reduction of about 40% in 24 hours (as discussed in Example, Section II, part C), while 70% reduction over 24 hours was achieved via addition of only 10 ppm of activated Bacillus.

Lastly, other benefits are associated with enhanced solubilization of colloids and particulates. These benefits, which will be obvious to those skilled in the art, include an increase in the apparent organic load capacity of certain wastewater plants, and reduced sludge generation, especially when the sludge (prior to treatment with the present invention), is substantially composed of undergraded colloidal and particulate organics.

We claim:

1. A method for solubilizing particulate or colloidal materials in wastewater treatment, comprising the steps of:
   cultivating aerobic bacteria in the presence of oxygen in an activator solution containing a food source until the level of the food source drops low enough to cause said bacteria to begin producing increased amounts of enzymes which solubilize particulate or colloidal materials thereby producing activated bacteria; and
   contacting said activated bacteria or said enzymes with said particulate or colloidal materials under conditions which solubilize said particulate or colloidal materials.

2. The method of claim 1, wherein said bacteria are cultivated in said activator solution until the soluble COD in said solution drops below 50 mg/l.

3. The method of claim 1, wherein said activated bacteria and enzymes are contacted with wastewater containing said colloidal or particulate material.

4. The method of claim 1, wherein said activated bacteria and enzymes are introduced into a pipe which contains grease as said colloidal or particulate material.

5. The method of claim 1, wherein said bacteria produce amylase and/or protease.

6. The method of claim 1, wherein said bacteria produce lipase.

7. A continuous method for solubilizing particulate or colloidal materials in wastewater treatment, comprising the steps of:
   (a) cultivating aerobic bacteria in a first activation tank in the presence of oxygen in an activator solution containing a food source for a given amount of time until the level of the food source drops low enough to cause said bacteria to begin producing increased amounts of enzymes which solubilize particulate or colloidal materials thereby producing activated bacteria;
   (b) thereafter cultivating aerobic bacteria in a second activation tank under the same conditions and for the same given amount of time as the bacteria in said first activation tank while continuously introducing said activated bacteria and/or said enzymes in said first activation tank to a waste treatment zone thereby continuously contacting said activated bacteria and/or said enzymes with said particulate or colloidal materials in said waste treatment zone under conditions which solubilize said particulate or colloidal materials;
   (c) thereafter continuously introducing said activated bacteria and/or said enzymes in said second activation tank to said waste treatment zone thereby continuously contacting said activated bacteria and/or said enzymes with said particulate or colloidal materials in said waste treatment zone under conditions which solubilize said particulate materials while simultaneously activating additional aerobic bacteria in said first activation tank; and
   (d) repeating said steps (b) and (c) as necessary to thereby continuously deliver activated bacteria and/or enzymes to said waste treatment zone.

8. The method of claim 7, wherein said given amount of time is 8 to 40 hours.

9. The method of claim 7, wherein said given amount of time is 16 to 32 hours.

10. The method of claim 7, wherein said given amount of time is 24 hours.

* * * * *